Aug. 21, 1928.
D. P. DICKIE
1,681,284
DRY SPOT CROSS ARM TERMINAL BOX
Filed Nov. 14, 1925
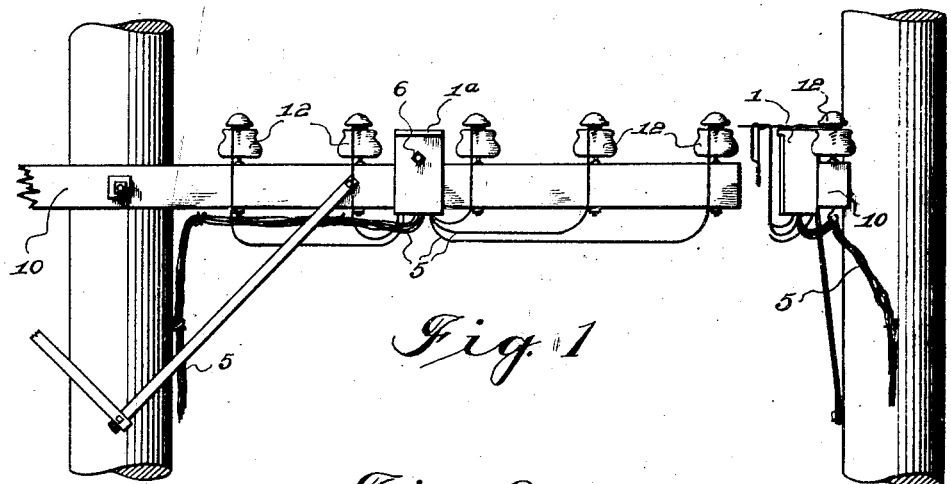
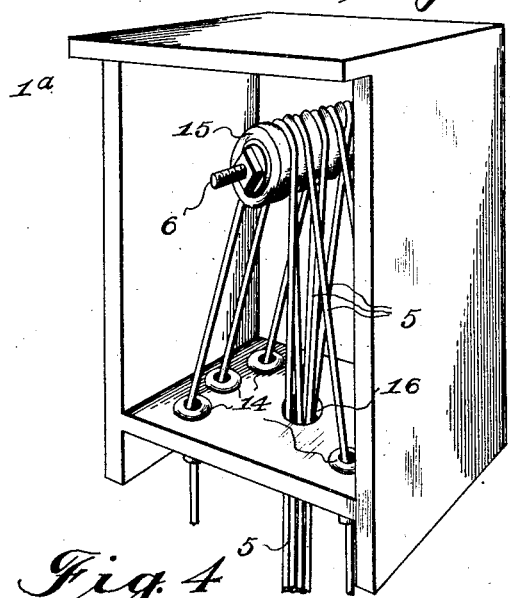
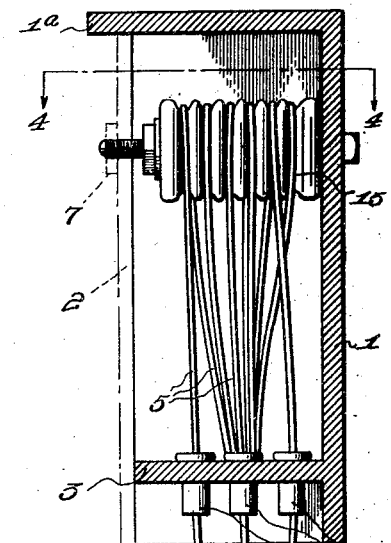
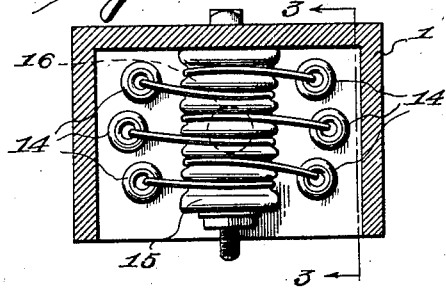
Inventor
D. P. Dickie
By Eugene C. Brown
Attorney Patented Aug. 21, 1928.

1,681,284

UNITED STATES PATENT OFFICE.

DOUGLAS P. DICKIE, OF NEW YORK, N. Y., ASSIGNOR TO THE WESTERN UNION TELEGRAPH COMPANY, OF NEW YORK, N. Y., A CORPORATION OF NEW YORK.

DRY-SPOT CROSS-ARM TERMINAL BOX.

Application filed November 14, 1925. Serial No. 69,095.

This invention relates to a method of preventing leakage of current from telegraph and telephone lines at a terminal or branch station.

In the construction of open lines for the transmission of electrical signals, it is a common practice to connect the bare line conductors, which terminate at a station and are "dead ended" on the insulators of the last cross-arm, by means of depending conductors, termed "bridle wires" which are led into the station office or to a cable passing down along the pole. During damp and wet weather the surfaces of the pole and the bridle wires become wet and form a leakage path between the line wires and the ground in spite of the fact that the bare line wires are supported upon insulators and the bridle wires are covered with rubber insulation. To prevent this it has been proposed to prevent access of moisture to a continuous ring about the circumference of each bridle wire by embedding a short portion of the wire in the body of an insulator, the insulator being usually suspended from the line wire by the bridle wire. Dry spot insulators of this type are quite expensive and, if the bridle wire is to be an unbroken continuous insulated wire, it must be molded within the insulator.

The object of my invention is to provide an inexpensive device which may be easily secured to the cross-arm which will maintain an extended dry surface on a plurality of bridle wires, protecting them from rain, snow and moisture and which will support the wires in spaced relation at the same time permitting ready access for inspection or for the purpose of changing the bridle wires from one line wire to another. The protected part of the bridle wire becomes in effect, a dry spot or length in the superficial surface of the wire which effectually prevents any leakage between wires and ground.

In the following detailed description, I shall refer to the accompanying drawings in which:—

Figure 1 is a fragmentary side elevation of a cross-arm showing the manner of leading the bridle wires from the bare line wires to my bridle-wire dry spot terminal box;

Figure 2 is a perspective view of the box with the lid or side cover removed;

Figure 3 is a vertical sectional view of the same; and

Figure 4 is a transverse sectional view on the line 4—4 of Figure 3.

The case or box 1 forming the housing or protective enclosure may be rectangular or any other suitable shape and is preferably constructed of stamped or cast metal. The front edge of the top wall 1ª projects beyond the box to overhang the cover or lid 2. The side walls depend below the floor 3 to provide a protected outer recess for the wires as they emerge from the box. The cover is fastened in any suitable manner to make a tight fit against the front edges of the walls and may be provided with an aperture to fit over the bolt 6 and be secured by a nut 7.

The bridle wire dry spot box is bolted or otherwise secured to the cross-arm 10 and so positioned that the runs of the bridle wires 5 leading from the line wires on the insulators 12 shall be as short as possible. The bridle wires must not touch any other wire or object between the line wire and the box. Each bridle wire is led into the box through a porcelain insulating bushing 14 which passes through the bottom of the box, and is bent over the bridle wire insulating support 15, passing downwardly and out through the common opening 16 in the floor of the box. The insulator 15 is preferably made of porcelain or glass, supported upon a bolt 6 and is provided with grooves to receive the bridle wires and maintain them in spaced relation.

Inasmuch as the wires enter and leave the box through the floor, practically no moisture will follow or creep along the wires into the box enclosure. Hence the surface along substantially the entire length or section of each wire within the box or housing will be maintained in a dry condition regardless of weather conditions. There is thus provided a sufficient length of dry braid and insulation along the wires within the box to insure against surface leakage under practically all conditions. The use of a single multi-groove insulator provides a simple and economical construction and one which is also fool-proof. By leading all of the wires to a single central exit opening it is possible to splice all of the wires to a cable within the box if this is desirable. On the other hand, if the bridle wires are to be carried to the station or office, each bridle wire may be a single length extending from the line wire to the office without a break.

I claim:

1. Means for preventing leakage of current from overhead terminal wires carried by the insulators on telegraph or telephone poles, comprising a housing completely closed to prevent the entrance of moisture and provided with means whereby it may be secured to a telegraph pole closely adjacent to the insulators, a plurality of openings in the floor or bottom wall of the housing, an insulating support mounted within said housing and provided with spacing means, and a plurality of continuous bridle wires adapted to be connected to overhead wires, said bridle wires passing in at separate openings in the bottom wall, over said support and out through another opening in the bottom wall, whereby they will be held in spaced relation and free from moisture within the housing.

2. In an organization as set forth in claim 1, said support comprising a multi-grooved insulator.

3. In an organization as set forth in claim 1, said openings being provided with insulating bushings.

4. In an organization as set forth in claim 1, the side walls of the housing depending below the floor to provide protection for the wires as they emerge from the housing.

In testimony whereof I affix my signature.

DOUGLAS P. DICKIE.